Dec. 27, 1955            R. E. FOX            2,728,492
AGRICULTURAL SPREADER AND SEEDER APPARATUS
Filed June 13, 1952            2 Sheets-Sheet 1
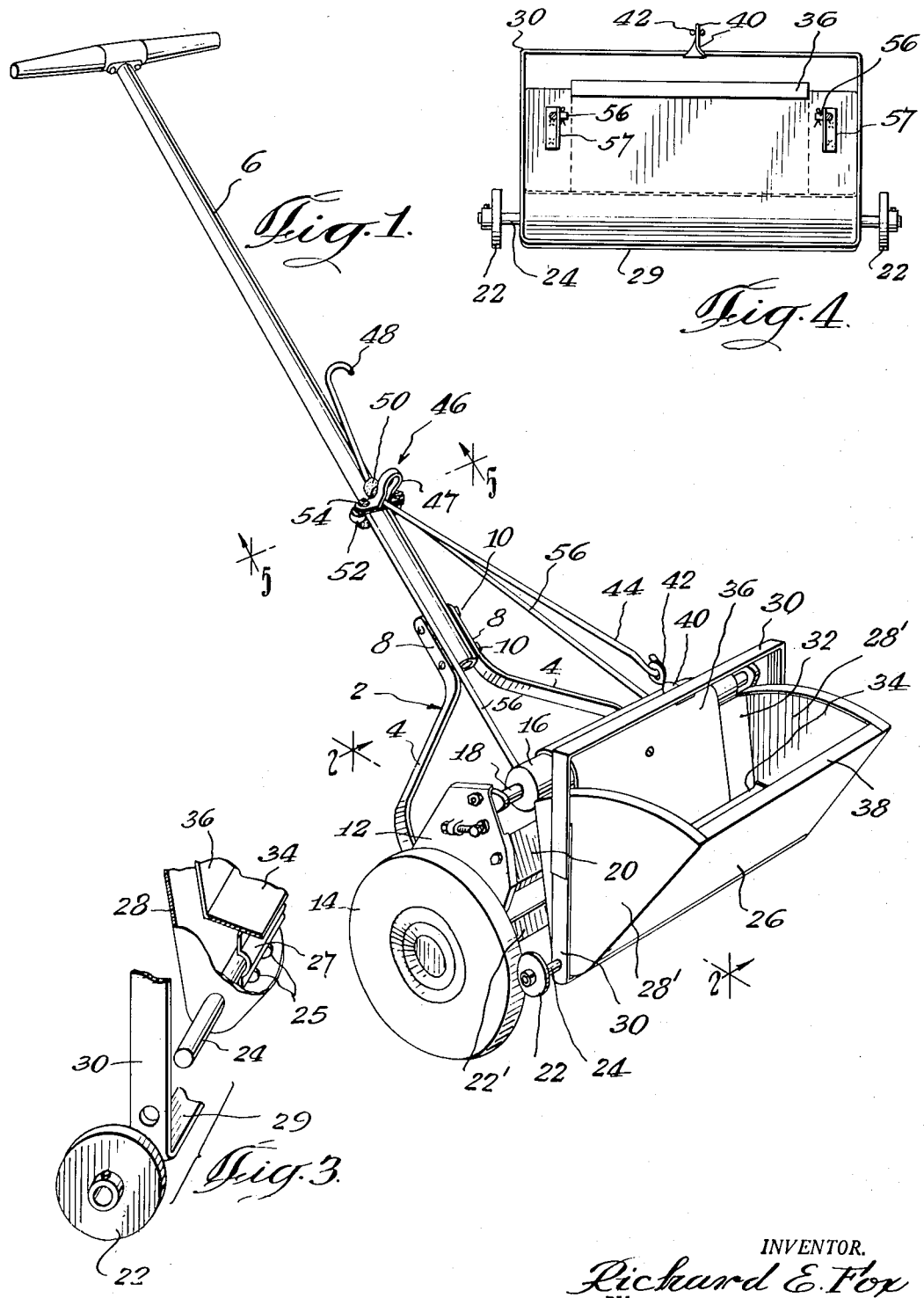
INVENTOR.
Richard E. Fox
BY Louis Bernat.
Attorney

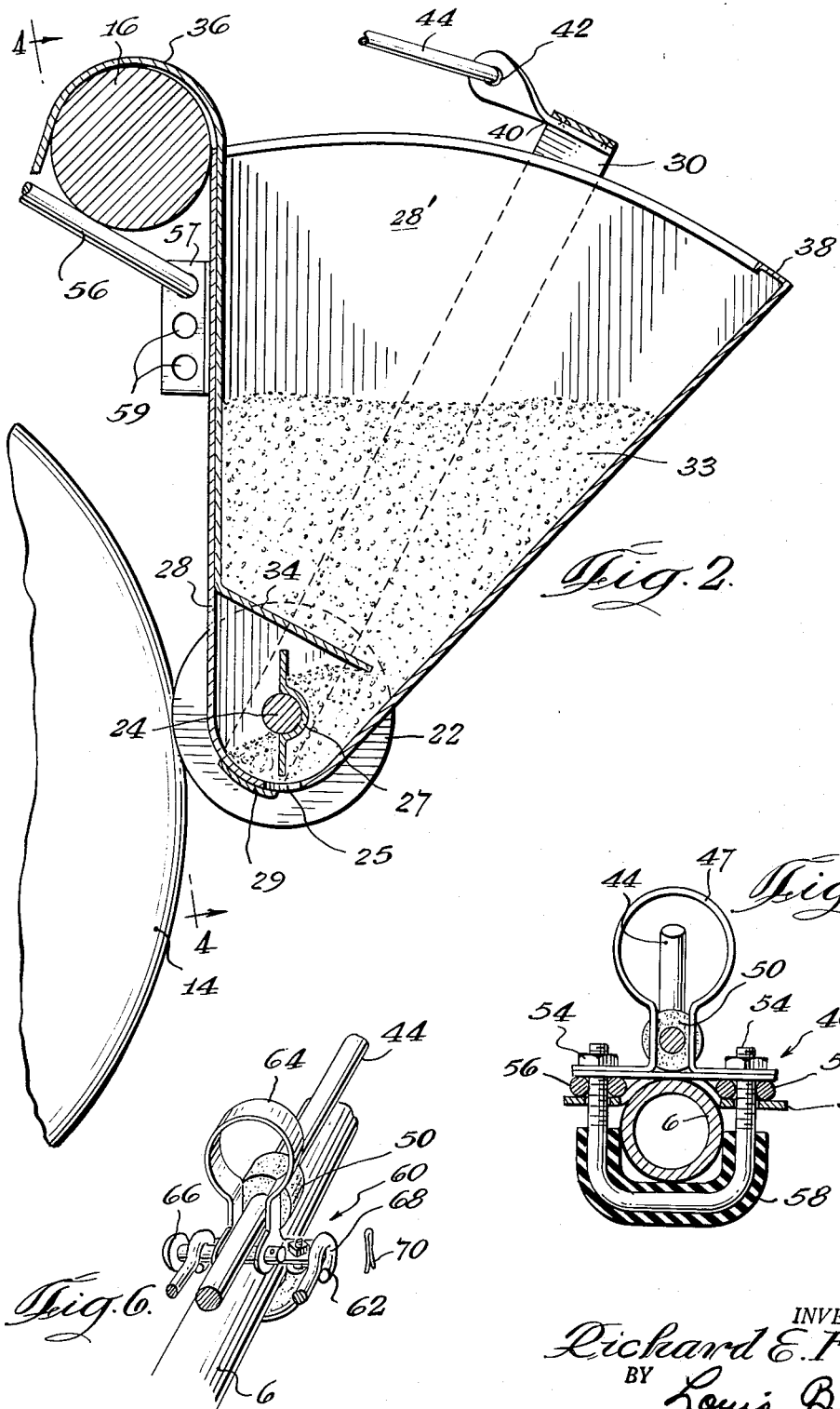

United States Patent Office 2,728,492
Patented Dec. 27, 1955

2,728,492

AGRICULTURAL SPREADER AND SEEDER APPARATUS

Richard E. Fox, Northbrook, Ill.

Application June 13, 1952, Serial No. 293,324

8 Claims. (Cl. 222—177)

This invention relates generally to a material spreading apparatus, and more particularly to improvements in an attachment for a lawn mower, adapted to be detachably connected to the mower to serve as an agricultural spreader and seeder apparatus.

An object of the invention is to provide an improved attachment for a lawn mower of the aforementioned character comprising a novel construction arrangement whereby materials, namely fertilizers, lime and other fluent solid chemicals; greens, grasses and legumens and like materials, may be dispensed in a manner so as to maintain a steady, even flow of the fluent solid material throughout the length of the spreader, even though the material which is being handled is highly cohesive, wet, green or improperly cured fertilizer; damp and/or densely packed seeds or greens; or materials which have set up and become lumpy or hard.

Another object of my invention is to provide a novel shutter construction for controlling the flow of the materials in order that such materials be dispensed and distributed evenly at small rates of discharge.

Another very important object of the invention is to provide an attachment for a lawn mower which may be expeditiously mounted for use on the conventional lawn mower without the necessity of making structural alterations therein.

Other and further objects of the invention are to provide a lawn mower attachment which will be comparatively simple in construction, strong, durable, highly efficient and reliable in use, compact, and which may be manufactured at low cost.

All the foregoing and still further objects and advantages of the invention will become apparent from a study of the following specification taken in connection with the accompanying drawings, wherein:

Figure 1 is a perspective view of an attachment constructed in accordance with the present invention mounted in position on a lawn mower;

Figure 2 is an enlarged cross-sectional view taken along line 2—2 of Figure 1;

Figure 3 is an enlarged fragmentary view illustrating the construction of the drive and agitator mechanism of the spreader;

Figure 4 is a rear view of the spreader showing the attaching construction;

Figure 5 is a cross-sectional view taken along line 5—5 of Figure 1 illustrating the spreader clamp attached to the handle of the mower; and Figure 6 is a perspective view of a portion of the handle of the mower illustrating a second embodiment of the spreader clamp.

Referring now to the drawings in detail, it will be seen that the embodiment of the invention which has been illustrated in Figure 1 comprises a conventional lawn mower having a frame structure 2 of suitable metal. The frame structure 2 includes a pair of side members 4 having inwardly curved portions which terminate in spaced parallel rear end portions 8. A handle 6 of wood or metal is positioned intermediate to the rear end portions 8 and adapted thereto. A bolt structure 10 attaches the handle 6 to said rear end portions 8 in a manner to form a conventional type lawn mower.

A carriage structure 12 of conventional design having a cross member 20 and cutting blades 22' is pivotally mounted intermediate the lawn mower wheels 14. A guide or trailing roller 16 supported on a shaft 18 is affixed at the lower portion of the carriage 12.

The conventional lawn mower operates in a manner wherein the carriage portion 12, as shown in Figure 1, is rotated through an angle of approximately 90° along with the frame 2 and the handle 6 so that the guide roll 16 bears on the grass in order to afford a guide for the cutting blades 22'. The cutting blades 22' are geared to the lawn mower wheels 14 so that when the lawn mower is driven forward the cutting blades 22' are rotated. By rotating the carriage structure 12 into a position as illustrated in Figure 1 along with the frame 4 and handle structure 6, the inverted lawn mower may be operated in the opposite direction so that the cutting blades 22' are now disengaged from the rotation of the mower wheels 14. The mower in this position affords a means for supporting the spreader, which is the subject matter of my invention.

The spreader comprises a hopper construction having side panels 28' and a front panel 26, which is a continuous segment of the rear panel 28. This is the conventional wrap-around construction utilized in the sheet metal art. Lip flanges 38 are formed along the front panel 26 and side panels 28' in order to afford rigidity of the hopper structure. A curved support 36 is formed of sheet metal and attached and keyed to the rear panel 28 by means of a bolt construction, and at the lower end thereof a material support 34 is formed in a manner extending across a substantial portion of said hopper just above the agitator 27. The agitator 27 is affixed to a drive shaft 24 by either welding or bolting; and the agitator means may assume various configurations in structure which are conventional in the art.

The drive shaft 24 is connected on its outer extremities to the agitator drive wheels 22, which engage the lawn mower wheels 14. These agitator wheels 22 may be adjusted in order to be in alignment with the lawn mower wheels 14.

In order to affix the spreader to the lawn mower, the curved support 36 is mounted on the top side of said guide roll 16. The rearward structure of the hopper is shown in Figure 4 wherein support angles 57 are either bolted or spot welded in spaced relationship to the rear panel 28. Eyelet mounting holes 59 are formed in said angles 57 as illustrated in Figures 2 and 4. In order to securely clamp the hopper in a fixed position onto said guide roll 16, fastening rods 56 are positioned within said mounting holes 59 in order that the fastening rods 56 bear on the guide roll 16. The opposite portion of said fastening rods 56 is attached to the spreader or handle clamp 46 as shown in Figure 5. The spreader or handle clamp 46 comprises a U-bolt structure 54 having a resilient sleeve 58 mounted thereon and a clamping plate 52 positioned adjacent to the fastening rod 56. Above said rod 56 is an arcuate locking member 47, which is affixed to the U-bolt structure 54 in a conventional manner.

Figure 2 is a cross-sectional view of the hopper illustrating the dispensing openings 25 positioned along the bottom thereof at intervals just below the agitator 27. A pivotal shutter 29, slightly arcuate in construction and conforming to the bottom portion of said hopper, is pivotally mounted on the shaft 24 in a manner illustrated in Figures 1 through 3. The metal supporting arms 30 of said shutter 29 extend upwardly in the form of a rectangle. Centerly on the upper portion thereof a mounting tab 40 is formed thereon having an eyelet 42 positioned therein. An arcuate shutter arm 44 engages said opening 42 and extends upwardly in a similar plane as the handle extending through the arcuate locking member 47 as illustrated in Figure 5. A resilient stop member 50 is positioned on said shutter arm 44 rearwardly to the arcuate locking member 47. By adjusting the curved portion 48 of the shutter rod 44, the shutter 29 would be rotated in a manner either to partially open the openings 25 in the hopper or to completely open said openings 25 in order to control the rate of flow of the fluent solid material 33 from the hopper.

The clamping rod 56 is designed to be readily detachable from the hopper in order that the hopper may be removed from the mower by allowing the shutter rod 44 to either be released from the tab 40 or allowing the curved portion 48 to be withdrawn through the opening in the locking member 47. The method of disengaging the ends of the clamping rods 56 may be performed by removing the pins as shown in Figure 4 or by inserting the curved ends of said rods from the inward direction through the openings 59, which is opposite to that illustrated in Figure 4; and by compressing the rods 56 formed in bowed spring-like manner, the rod ends 56 may be released from the angles 57. The opposite end of the rods 56 is continuous and is looped within the U-bolt structure 54 as illustrated in Figure 5.

Figure 6 illustrates another embodiment utilizing two separate clamping rods 56 which are clamped together by a pin 66 through a formed eyelet 62 in the end hooks 68 of the rods 56. A cotter key 70 is inserted in the end of the pin 66 in order to clamp the rods to a modified arcuate locking member 64. This modification affords a simple method of detaching the ends of the clamping rods 56 from the rear panel 28 of the hopper and then folding back these rods along the handle 6.

The agitator 27 is driven by the agitator wheels 22 which bias and engage the lawn mower wheels 14. In order to secure a positive drive it is necessary that these agitator wheels bear frictionally on the lawn mower wheels 14 in a rolling friction manner so that the agitator may be rotated within the hopper under various loads of solid materials 33 contained within the hopper. It shall be noted that the load in the hopper is displaced forwardly from the center line, namely the rear panel 28 of the hopper. Therefore the weight of the material 33 will direct a force downwardly and inwardly so that the agitator wheel 22 will frictionally bear on the lawn mower wheel 14. Since the guide roll 16 is pivotally mounted, the hopper will adjust itself in order to frictionally engage the lawn mower wheels 14. This type of adjustment allows for variations in the mechanical construction of various lawn mowers.

Since there are many types of lawn mower constructions which are not constructed to standard specifications, it is necessary that the hopper adjust itself accordingly. In order that the hopper be positioned in an off-centered manner, the carriage 12 is preferably positioned near its uppermost stop and is held in such adjusted position by the relative position of the clamp member 46 on the handle 6 of the lawn mower.

Although drawings 1 and 4 illustrate fastening means comprising a pair of rods 56, it shall be apparent to one skilled in the art that a single rod may be employed in an intermediate position affixed to the rear panel 28 and terminating at the spreader clamp 46. Numerous fastening arrangements may be used for a single rod 56 as may be suggested in Figures 5 and 6.

The spreader clamp 46 may adopt a number of specific embodiments wherein the rod 44 may be affixed to the clamp in a manner wherein the length of the rod 44 may be adjusted and indexed in order to adjust and determine the relative position of the shutter 29 with respect to the openings 25. By adjusting the shutter 29 to a predetermined position, various standard rates of flow of the material 33 may be achieved. It has been found that elongated slots 26 may be used instead of the circular openings 25 as shown.

For spreading and distributing materials, such as weed killers, seeds and the like, it is desirable to have the lower portion of the hopper, namely the openings 25, substantially close to the earth or grass. The reason is to restrict the distribution of the material over finite areas and, therefore, it is highly desirable to adjust the lower portion of the hopper to a distance of approximately 2 to 4 inches from the ground level in this instance. This adjustment can be accomplished by varying the position of the spreader clamp 46 on the handle 6. It shall be noted that the carriage 12 is pivotally adjustable so that it will compensate for any desired position.

Another advantage of this invention as described is that there is a ratio of approximately 6:1 in the speeds of rotation of the drive wheel 22 with respect to the lawn mower wheel 14. This ratio permits a relatively fast rotation of the agitator 27 in order to break up and disperse the material 33.

Thus it will be apparent that my novel apparatus results in the efficient dispensing and/or sowing of material in both small and large quantities even though this material be lumpy, set, hard and cohesive, and can readily be detached from the lawn mower in order to be stored without requiring unnecessary mechanical operations.

While I have shown and described certain preferred embodiments of my invention, it is to be understood that these embodiments have been given by way of example only, and that various changes and rearrangements of the details shown herein may be made without departing from the spirit of the invention, the scope of which is defined in the appended claims.

I claim as my invention:

1. An attachment for an inverted lawn mower having a pair of driving wheels, a trailing roller and a handle for spreading fertilizer and the like comprising a hopper extending between said wheels, one side of said hopper having curved means arranged to partially surround one side of said roller, a shaft extending through said hopper and having at its outer ends driving wheels in frictional rotational engagement with the lawn mower driving wheels, and agitator means mounted on said shaft within said hopper.

2. An attachment for an inverted lawn mower having a pair of driving wheels, a trailing roller and a handle for spreading fertilizer and the like comprising a hopper extending between said wheels, one side of said hopper having curved means arranged to partially surround one side of said roller, a shaft extending through said hopper and having at its outer ends driving wheels in frictional rotational engagement with the lawn mower driving wheels, agitator means mounted on said shaft within said hopper, and fastening means having one end detachably secured to said side of said hopper and being arranged to pass on the other side of said roller and secured to the handle of said mower.

3. An attachment for an inverted lawn mower having a pair of driving wheels, a trailing roller and a handle for spreading fertilizer and the like comprising a hopper extending between said wheels, one side of said hopper having curved means arranged to partially surround one side of said roller, a shaft extending through said hopper and having at its outer ends driving wheels in contact rotational engagement with the lawn mower driving wheels, agitator means mounted on said shaft within said hopper, fastening means having one end detachably secured to said side of said hopper and being arranged to pass on the other side of said roller, and the other end of said means mounted on said handle for holding the other ends of said fastening means in position.

4. An attachment for an inverted lawn mower having a pair of driving wheels, a trailing roller and a handle for spreading fertilizer and the like comprising a hopper extending between said wheels, one side of said hopper having curved means arranged to partially surround one side of said roller, a shaft extending through said hopper and having at its outer ends driving wheels directly coupled to the lawn mower driving wheels, agitator means mounted on said shaft within said hopper, a pair of rods each having one end detachably secured to said side of said hopper and being arranged to pass on the other side of said roller, and the other end of said means mounted on said handle for holding the other ends of said rods in position.

5. An attachment for an inverted lawn mower having a pair of driving wheels, a trailing roller and a handle for spreading fertilizer and the like comprising a hopper extending between said wheels, one side of said hopper having along its edge a curved extension member arranged to partially surround one side of said roller, a shaft extending through said hopper adjacent its bottom and having at its outer ends driving wheels directly coupled to the lawn mower wheels, agitator means mounted on said shaft within said hopper, said hopper having an opening at its bottom, and a shutter for said opening, an actuating member for said shutter extending from said hopper to an intermediate point on said lawn mower handle.

6. An attachment for an inverted lawn mower having a pair of driving wheels, a trailing roller and a handle for spreading fertilizer and the like comprising a hopper extending between said wheels, one side of said hopper having along its edge a curved extension member arranged to partially surround one side of said roller, a shaft extending through said hopper adjacent its bottom and having at its outer ends driving wheels directly coupled to the lawn mower wheels, agitator means mounted on said shaft within said hopper, said hopper having an opening at its bottom, a shutter for said opening, an actuating member for said shutter extending from said hopper to an intermediate point on said lawn mower handle, and fastening means having one end secured to an intermediate point on said lawn mower handle and the other end of said means fastened to said hopper.

7. An attachment for an inverted lawn mower having a pair of driving wheels, a trailing roller and a handle for spreading fertilizer and the like comprising a hopper extending between said wheels, one side of said hopper having along its edge a curved extension member arranged to partially surround one side of said roller, a shaft extending through said hopper adjacent its bottom and having at its outer ends driving wheels directly coupled to the lawn mower wheels, agitator means mounted on said shaft within said hopper, said hopper having an opening at its bottom, a shutter for said opening, an actuating member for said shutter extending from said hopper to an intermediate point on said lawn mower handle, fastening means having one end secured to an intermediate point on said lawn mower handle, and said fastening means extending to said hopper on the other side of said roller.

8. An attachment for an inverted lawn mower having a pair of driving wheels, a trailing roller and a handle for spreading fertilizer and the like comprising a hopper extending between said wheels, one side of said hopper having along its edge a curved extension member arranged to partially surround one side of said roller, a shaft extending through said hopper adjacent its bottom and having at its outer ends driving wheels directly coupled to the lawn mower wheels, agitator means mounted on said shaft within said hopper, said hopper having an opening at its bottom, a shutter for said opening, an actuating member for said shutter extending from said hopper to an intermediate point on said lawn mower handle, fastening means having one end secured to an intermediate point on said lawn mower handle, said fastening means extending to said hopper on the other side of said roller, and means on said hopper for detachably engaging the ends of said fastening means.

References Cited in the file of this patent

UNITED STATES PATENTS

| Number | Name | Date |
| --- | --- | --- |
| 887,247 | Geiger | May 12, 1908 |
| 940,538 | Le Gore | Nov. 16, 1909 |
| 1,295,609 | Schulze | Feb. 25, 1919 |
| 1,876,409 | Gordon | Sept. 6, 1932 |
| 1,888,821 | Fearn | Nov. 22, 1932 |
| 1,948,861 | Lindgren | Feb. 27, 1934 |
| 2,242,710 | Loomis | May 20, 1941 |
| 2,326,739 | Andrews | Aug. 17, 1943 |
| 2,551,096 | Chittick | May 1, 1951 |
| 2,605,587 | Webster et al. | Aug. 5, 1952 |